United States Patent Office 2,806,849
Patented Sept. 17, 1957

---

2,806,849

PROCESS FOR THE PREPARATION OF STEROID SUBSTANCES

John Harold Chapman, Ruislip, and Leonard James Wyman, Southall, England, assignors to G. N. R. D. Patent Holdings Limited, London, England, a British company No Drawing. Application November 19, 1954,
Serial No. 470,138

Claims priority, application Great Britain
November 25, 1953

12 Claims. (Cl. 260—239.55)

This invention is concerned with improvements in or relating to the preparation of 3-hydroxy-11-keto steroids and 3-esters thereof, which may be represented by the general formula

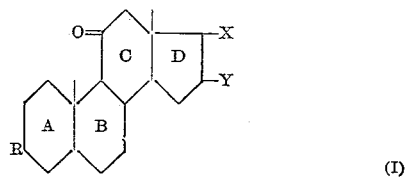

where X and Y each represent hydrogen or a monovalent substituent, and may be the same or different, and R is a hydroxy or esterified hydroxy group in the α- or β-configurations. In the above formula X and Y may together form a single substituent group, as for example, is the case with the hecogenin side chain.

The preparation of steroid compounds having an oxygen function at position 11 is known to be of importance in the synthesis of various steroids of physiological interest and has given rise to various difficulties; it is one of the objects of this invention to produce such compounds in a more convenient manner than hitherto, particularly from steroid intermediates of the allo series, as may for example, be derived from hecogenin. Thus it will be seen that the compounds prepared according to the invention (of Formula I) are useful intermediates, inter alia in the synthesis of cortisone and related substances as the 3-substituent can be converted into the 3-keto-Δ⁴-system occurring in such compounds and the side-chain can, for example, in the case of isosapogenins be readily converted into the $C_{17}$ side-chain of cortisone (see for example: Chamberlin et al., J. Amer. Chem. Soc., 1953, 75, 3477; Rosenkrantz et al., ibid., 1951, 73, 4055; Chemerda et al., ibid., 1951, 73, 4052; Rosenkrantz et al., Nature, 1951, 168, 28).

The production of 11-oxygenated steroids by the use of intermediates of the formula

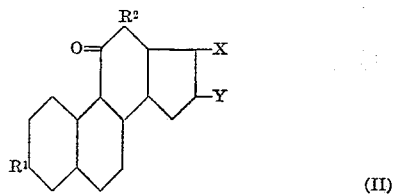

(where $R^1$ and $R^2$ are esterified hydroxy groups) has been proposed. Thus Gallagher et al. (J. Biol. Chem., 1949, 177, 951) have described the production of a 3:11-oxygenated steroid of the normal series by treating the 3:12-dihydroxy-11-keto steroid 3-monoester with a halogenating agent to replace the 12-hydroxy group by a halogen atom and subjecting the resulting halogen compound to reduction, for example by treatment with zinc and glacial acetic acid (see also United States Patent 2,447,325).

In the allo series Djerassi et al. (J. Org. Chem., 1951, 16, 303) have described the production from hecogenin of 3β:12β-diacetoxy-11-oxo-5α:22a-spirostane but the oxygen function at the 12-position in this compound cannot be removed by the method described by Gallagher et al. (loc. cit.) for the normal series (Mueller et al., J. Amer. Chem. Soc., 1953, 75, 4892) and tests have also shown that it cannot be hydrogenolysed by zinc/hydrochloric acid, zinc/toluene, zinc/acetic acid or zinc/acetic anhydride. Djerassi, in fact, was forced to proceed by oxidation to the 11:12-diketone and selective reduction at position 12 in order to obtain compounds of Formula I above and this involves several stages with a low overall yield (J. Amer. Chem. Soc., 1951, 73, 5513).

We have now found, however, that 3-hydroxy-11-keto steroids and esters thereof (Formula I) can be prepared directly and conveniently in good yield from 3:12-dihydroxy-11-keto steroid diesters by direct reduction using as reducing agent an alkali or alkaline earth metal in the presence of liquid ammonia.

In the process according to the invention it has been desirable to eliminate as far as possible from the actual reduction reaction any substituent or reactant which can act as a source of protons; where proton sources are present, for example if the steroid possesses a free hydroxy group either in the ring or in the side-chain, considerable or even complete reduction of the 11-keto group may take place. For this reason in particular, steroid starting materials containing any group which can act as a source of protons are not suitable for the present process.

The effect of the present process is usually to hydrolyse, at least partially, the 3-ester group of the starting material so that the product obtained is usually a mixture of the corresponding 3-hydroxyl and 3-esterified hydroxyl compounds: if the end-product of Formula I in which R is a hydroxyl group is required, the hydrolysis is preferably completed during the stage of working-up by an alkali treatment; alternatively if a compound containing an esterified hydroxyl group in the 3-position is required, the alkali treatment should be replaced by re-esterification.

According to the present invention, therefore, we provide a process for the preparation of steroid substances of the general formula

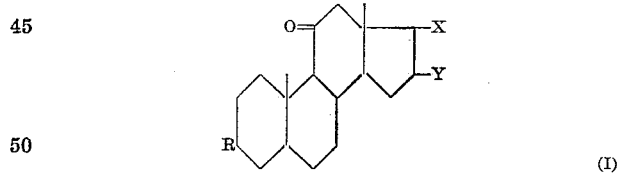

where R is a hydroxyl group or an esterified hydroxyl group having α- or β-configurations and where X and Y have the above stated meaning, the step of reducing a compound of the general formula

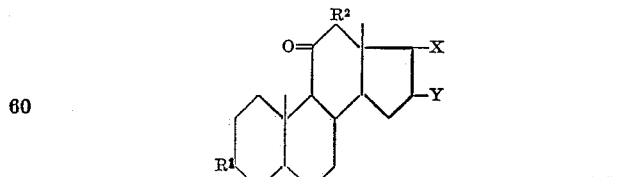

(where $R^1$ and $R^2$ are esterified hydroxyl groups having α- or β-configuration, and in which X and Y do not contain any groups which can act as a proton source), with an alkali or alkaline earth metal in the presence of liquid ammonia.

According to a feature of the invention, the said alkali metal is lithium, sodium or potassium and the alkaline earth metal is calcium, strontium or barium.

The compounds of Formulae I and II above are only slightly soluble in liquid ammonia and in order to facilitate the reaction it is desirable to have present an inert organic solvent in which these compounds are soluble and which is liquid at and below the boiling point of ammonia; suitable solvents are, for example, ether, toluene and tetrahydrofuran.

The reduction reaction according to the invention is preferably carried out at a temperature between −60° C. and −33° C., with an excess of alkali or alkaline earth metal, for example up to 6 gm.-atomic proportions. The reaction of the steriod starting material with the alkali or alkaline earth metal gives rise to a metal complex which can readily be decomposed upon completion of the reduction for example by treatment with ammonium chloride, water or alcohol.

In the carrying out of the reduction reaction according to the invention care should be taken to avoid as far as possible the introduction of compounds that can act as a source of protons in the presence of unreacted metal. Thus one should preferably not attempt to decompose the metal complex until any excess of metal has been removed. In one method of operation we may form a solution of the alkali or alkaline earth metal in the liquid ammonia and add thereto the steroid compound in solution in an organic solvent until the blue colour produced by the free metal has just been discharged; at this stage decomposition of the steroid metal complex can readily be effected.

We prefer however particularly when operating on larger scales, to react the steroid starting material with a substantial excess of the metal reducing agent and to decompose the excess metal by adding excess of a compound which reacts therewith without the production of protons; such a compound is bromo-benzene or ethylene dibromide. After removal of the excess metal the alkali metal/steroid complex may be decomposed as described above.

As stated above complete hydrolysis of the 3-ester group can conveniently be achieved by alkaline hydrolysis, with for example ethanolic potassium hydroxide, of the crude reaction product obtained from the reduction. Alternatively the crude product may be re-esterified, for example by treatment with a suitable acid anhydride, such as acetic anhydride, for example in pyridine. The product, after such treatment, can be isolated in any convenient manner, for example by extracting with ether and may be crystallised from, for example, acetone.

The process according to the invention is of particular value in the synthesis of cortisone from steroids of the allo series, for example, hecogenin. Thus according to a feature of the invention we are able to reduce compounds wherein the substituents X and Y designate the side-chain of hecogenin, as represented by the formula

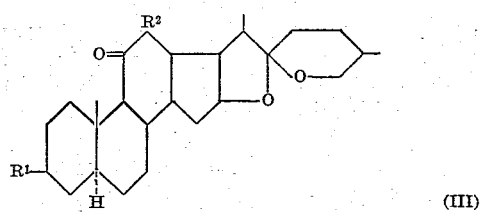

(i. e. diesters of 3β:12-dihydroxy-11-oxo-5α:22a-spirostane). The reaction according to the invention may obviously also be conducted upon suitable derivatives of such compounds, i. e. derivatives of 3β:12-dihydroxy-11-oxo-5α:22a-spirostane diesters wherein the side-chain has been degraded by methods customary in the production of the characteristic side-chain of cortisone and which derivatives do not contain a group which can act as a source of protons. Methods of degrading the ring D substituents of hecogenin with a view to elaborating the cortisone-type structure in ring D have previously been described (see Chamberlin et al., J. Amer. Chem. Soc., 1953, 75, 3477). The production of 3β:12β-dihydroxy-11-oxo-5α:22a-spirostane diesters has previously been described by Djerassi et al. (J. Org. Chem., 1951, 16, 303).

The esterifying groups which may be present in the 3- and 12-positions in the starting materials according to the invention may be of varied type. Thus for example, esters of alkyl, aryl and aralkyl carboxylic acids may be used as well as sulphonic acid esters. The esterifying group at each of the two positions need not of course, be the same. Acetyl, propionyl, benzoyl and methane-sulphonyl (mesyl) esters are for example, convenient.

In order that the invention may be well understood the following examples are given by way of illustration only:

EXAMPLE 1

Lithium metal was added to liquid ammonia (100 ml.) stirred in nitrogen until a faint blue colour remained for one minute. Lithium (40 mg.; 6 gm.-atomic proportions) was then dissolved in the ammonia and a solution of 3β:12β-diacetoxy-11-oxo-5α:22a-spirostane (0.5 g.) in dry ether (50 ml.) and dioxan (5 ml.) was added rapidly until the blue colour of the solution was discharged. The quantity of starting material added at this point was 0.35 g. After stirring for 1 minute an excess of ammonium chloride was added and the ether and ammonia evaporated. The solid product was dissolved in ether and water, and the ethereal layer washed with water, dried and evaporated. The residue was dissolved in ethanol (35 ml.) and 4.5 N aqueous potassium hydroxide solution (8.5 ml.) was added. The solution was allowed to stand for 2½ hours and worked up with ether in the usual way. The product (0.25 g.; 88% of theory), M. P. 208–216°, was re-crystallised from acetone M. P. 210°–218°. Its I. R. absorption (CS₂) showed bands indicating the presence of a hydroxyl group (1036 and 3300 cm.⁻¹), an unconjugated carbonyl group (1706 cm.⁻¹), and an isosapogenin. It was throughout substantially identical with the absorption of an authentic specimen of 3β-hydroxy-11-oxo-5α:22a-spirostane and differed from that of the starting ketol, which also, on admixture, depressed its melting point to 201–4°.

EXAMPLE 2

A 500 ml. 3-necked flask was fitted with a fibre-sealed stirrer, dropping funnel and constricted outlet tube to prevent entry of atmospheric moisture. Liquid ammonia (100 ml.) was introduced into the flask, and was stirred mechanically during the addition of calcium metal (200 mg.) in small pieces. When the metal had dissolved, the deep blue solution was treated very slowly with a 10% w./v. solution of 3β-12β-diacetoxy-11-oxo-5α:22a-spirostane in pure dry tetrahydrofuran. Addition was stopped when the blue colour of the metal-ammonia solution was discharged, which occurred when 11 ml. of the steriod solution had been added in 5 minutes.

Alcohol (100 ml.) was added to the mixture, the ammonia was boiled off on the steam-bath, and the resultant solution was boiled for 30 minutes with potassium hydroxide (1 g.). The product was precipitated by addition of a 5% aqueous solution of acetic acid (to prevent co-precipitation of basic calcium salts), and was isolated by chloroform extraction as a colourless solid (0.75 g.) M. P. 205–211° C. [α]$_D$ −33° (CHCl₃).

Two recrystallisations from methanol gave pure 3β-hydroxy-11-oxo-5α:22a-spirostane M. P. 221–222° [α]$_D$ −30° (CHCl₃). Acetate, M. P. 219–222° [α]$_D$ −39° (CHCl₃) undepressed on admixture with an authentic specimen.

EXAMPLE 3

*Reduction of 3β-acetoxy-12β-mesyloxy-11-oxo-5α:22a-spirostane*

A solution of calcium (300 mg.) in liquid ammonia (100 ml.) was prepared as described above. A solution of the 3β-acetoxy-12β-mesyloxy-11-oxo-5α:22a-spirostane (1.13 g.) in sodium-dried tetrahydrofuran (10 ml.) was added over 2 minutes, the mixture was stirred for a further 2 minutes, and the excess calcium was decomposed by dropwise addition of bromobenzene. Alcohol (20 ml.) was added, the ammonia was boiled off, and the product was precipitated with 5% aqueous acetic acid (100 ml.), filtered off and washed with water. It was refluxed in 5% methanolic KOH (20 ml.) for 1 hour, precipitated with water, filtered off, washed and dried giving 3β-hydroxy-11-oxo-5α:22a-spirostane, 0.87 g., M. P. 205-215°, [α]$_D$ —32°.

The product was benzoylated in pyridine (10 ml.) with benzoyl chloride (1 ml.) for 2 hours at room temperature. The product was precipitated with water filtered off, washed with water, dried and crystallised from chloroform/methanol (1:3) as rods, M. P. 228-232°, [α]$_D$ —32°, 0.703 g. (65%). Identified as 3β-benzoyloxy-11-oxo-5α:22a-spirostane by I. R. spectrum.

EXAMPLE 4

*Reduction of 3β:12β-dibenzoyloxy-11-oxo-5α-:22a-spirostane*

A solution of 3β:12β-dibenzoyloxy-11-oxo-5α:22a-spirostane in pure dry tetrahydrofuran (3.27% w./v.) was added dropwise to a stirred solution of calcium (120 mg.) in liquid ammonia (50 ml.) prepared as described above. When 15.9 ml. of the solution (=0.52 g. 3β:12β-dibenzoyloxy-11-oxo-5α:22a-spirostane) had been added over 4 minutes, the blue colour of the solution was discharged. Ammonium chloride (1 g.) was added to the mixture, the ammonia was boiled off on the steam bath and water (100 ml.) was added to the residue. The mixture was made neutral to litmus with hydrochloric acid, and the crystalline product was filtered off. It was refluxed in methanol (10 ml.) with KOH (0.5 g.) for 1 hour, precipitated with water, and extrated with chloroform. The extract was washed with water, dried with sodium sulphate and distilled to dryness. The residue was crystallized from methyl-ethyl ketone as prisms, M. P. 217-222°, 0.239 g. [α]$_D$ —30° (CHCl$_3$), identified by I. R. spectrum and mixed melting point as 3β-hydroxy-11-oxo-5α:22a-spirostane.

A sample of the product gave an acetate M. P. 212-218°, [α]$_D$ —39°.

EXAMPLE 5

3β:12β-diacetoxy-5α:22a-spirostane-11-one (1.06 g.) dissolved in dry tetrahydrofuran (40 ml.) was added to a stirred solution of sodium (276 mg.) dissolved in liquid ammonia (50 ml.). The reaction was carried out in a Pyrex flask fitted with a sealed stirrer and a vent closed by a plug of glass wool, and the stirring was continued for 35 minutes. The sodium which remained in solution was then oxidised by blowing dry air through the reaction mixture until the blue colour was discharged, solid ammonium chloride (1 g.) was added, the ammonia evaporated, water was added to the residue and the product isolated by extraction with chloroform. After removal of the solvent the crude product was acylated by heating on a steam bath for 1 hour with pyridine (10 ml.) and acetic anhydride (10 ml.). Addition of water precipitated the crude 11-oxotigogenin acetate, which was purified by crystallisation from aqueous acetic acid (563 mg.), M. P. 213-216°, [α]$_D$ —41° (chloroform). The identity of the product was further confirmed by infra-red spectroscopy and paper chromatography.

EXAMPLE 6

A solution of 3β:12β-diacetoxy-5α:22a-spirostan-11-one (10% w./v.; in dry tetrahydrofuran) was added dropwise to a solution of potassium (700 mg.) in liquid ammonia (100 ml.) until the blue colour of the metal ammonia solution was discharged. This occurred when 25 ml. of solution (equivalent to 2.5 g. of 3β:12β-diacetoxy-5α:22a-spirostan-11-one) had been added. Alcohol (40 ml.) was then added and the ammonia distilled off. The residual alcoholic solution was treated with potassium hydroxide (1 g.) and refluxed for 1 hour. Addition of water to this solution precipitated a crystalline solid (1.55 g.), M. P. 206-210°, [α]$_D$ —35°, which was shown by paper chromatography to be a mixture of 11-oxotigogenin and 12β-hydroxy-11-oxotigogenin.

EXAMPLE 7

A solution of 3β:12β-diacetoxy-5α:22a-spirostan-11-one (1 g.) in dry tetrahydrofuran (10 ml.) was added to a stirred solution of barium (1 g.) in liquid ammonia (50 ml.). The reaction was carried out in a flask fitted with a sealed stirrer from which air and moisture were excluded, and the mixture stirred for 3 minutes after the addition of the steroid was complete. The excess barium was destroyed by the dropwise addition of bromobenzene until the blue colour of this solution was discharged. Water (2 ml.) was added to the reactants, the ammonia was evaporated and the product was precipitated by the addition of water (50 ml.) containing acetic acid (2 ml.). The crude product was hydrolysed by heating under reflux for 30 minutes in 10% methanolic potassium hydroxide, and the crude 11-oxotigogenin (0.78 g.), M. P. 208-216°, [α]$_D$ —32° (chloroform) was obtained on precipitation by water. Esterification using benzoyl chloride (5 ml.) in pyridine (5 ml.) for 2 hours at 25° gave 11-oxotigogenin benzoate (770 mg.), purified by crystallisation from chloroform/methanol, M. P. 231-233°, [α]$_D$ —32° (chloroform).

EXAMPLE 8

*Reduction of 3β:12α-diacetoxy-5α:22a-spirostan-11-one*

3β:12α-diacetoxy-5α:22a-spirostan-11-one (500 mg.) in pure dry tetrahydrofuran (10 ml.) was added over two minutes to a stirred solution of calcium (0.14 g.) in liquid ammonia (50 ml.). The mixture was stirred for a further two minutes, and the excess calcium was then decolourised by dropwise addition of bromobenzene. Ethanol (10 ml.) was added, and the ammonia was evaporated. The product was precipitated with 1% acetic acid in water (100 ml.), filtered off, washed with water, and dried. It was hydrolysed (15 ml.) for one hour, the product was precipitated with water, filtered, washed and dried to give crude 11-oxotigogenin (355 mg.), M. P. 206-213°, [α]$_D$ —31° (chloroform). This material was benzoylated in pyridine (5 ml.) wih benzoyl chloride (0.5 ml.) for 2 hours at room temperature. Water was added, and after a further 2 hours the product was filtered off, dried, and crystallised from chloroform/methanol to give 11-oxotigogenin benzoate. Yield 363 mg., [α]$_D$ —32° (chloroform), M. P. 228-232°. Identified by mixed melting point and by infra-red spectroscopy.

EXAMPLE 9

A solution of 3β:12β-diacetoxy-5α:22a-spirostan-11-one (10 g.) in dry toluene (100 ml.) was added during 5 minutes to a vigorously stirred solution of calcium (2.8 g.) in ammonia (300 ml.; previously dried with a small quantity of calcium). The mixture was stirred 5 minutes and dry ethylene dichloride (1.5 ml.) added dropwise. After 10 minutes' stirring, water (3.3 ml.) was added slowly and the ammonia allowed to exaporate. Water and acetic acid were added to the residue to dissolve the calcium salts, and the product isolated with toluene. After removal of the toluene the product was refluxed for one hour with methanol (133 ml.) and a solution of sodium hydroxide (3 g.) in water (6 ml.) Half the methanol was distilled off, water (10 ml.) added and the mixture cooled overnight, to 0°. The produce was filtered off and washed with aqueous methanol. Crystallisation from benzene/petrol gave 11-oxotigogenin (5.1 g.), M. P. 214-222°, [α]$_D$ —31.4° (chloroform). The identity of the product was confirmed by infra-red spectroscopy.

EXAMPLE 10

3α-hydroxy-11-oxocholanic acid

Methyl 3α:12β-diacetoxy-11-oxocholanate (1 g. was dissolved in pure dry ether (25 ml.) and the solution was added during 2 minutes to a stirred solution of calcium (300 mg.) in liquid ammonia (75 ml.). After a further 3 minutes, the blue colour of the excess calcium was destroyed by addition of a few drops of bromobenzene, and water (5 ml.) was then added.

The ammonia and ether were evaporated, and the residue was hydrolysed for 1 hour in refluxing 10% methanolic potassium hydroxide (25 ml.). The solution was diluted with water, acidified with hydrochloric acid and extracted with ether. The ether extract was washed with water and then extracted with dilute sodium hydroxide solution. Acidification of this extract gave 3α-hydroxy-11-oxocholanic acid (175 mg.), $[\alpha]_D$ +66° (ethanol). (Found: C, 73.79; H, 9.88. $C_{24}H_{38}O_4$ requires C, 73.80; H, 9.81.)

We claim:

1. A process for the preparation of 3-hydroxy-11-keto steroids and 3-esters thereof free of an oxygen function in the 12-position, comprising reacting in an inert reaction medium, a steroid compound selected from the group consisting of

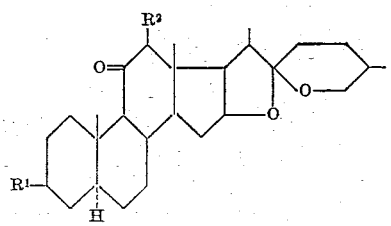

and

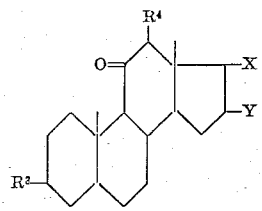

in which $R^1$ is a member selected from the group consisting of an acyloxy group derived from a lower carboxylic acid, a benzoyloxy group and a mesyloxy group, all of said groups having the β-configuration and $R^2$, $R^3$ and $R^4$ are each a member selected from the group consisting of an acyloxy group derived from a lower carboxylic acid, a benzoyloxy group and a mesyloxy group having the α- and β-configuration and X and Y are each a member selected from the group consisting of a hydrogen atom and a

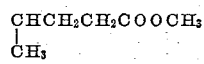

group with a metal selected from the group consisting of alkali and alkaline earth metals in the presence of liquid ammonia and decomposing the resulting steroid/metal complex.

2. A process as claimed in claim 1 in which the reaction with said metal is carried out in the presence of an inert organic solvent.

3. A process as claimed in claim 2 in which said organic solvent is selected from the group consisting of ether, toluene and tetrahydrofuran.

4. A process as claimed in claim 1 in which said steroid/metal complex is decomposed by reaction with a compound selected from the group consisting of ammonium chloride, water and an alcohol.

5. A process as claimed in claim 1 in which the reaction between the steroid compound and the metal is continued until all of the metal has been reacted to form said steroid/metal complex prior to decomposition of said complex.

6. A process as claimed in claim 1 in which an excess of metal is employed in the reaction between the steroid compound and said metal and the unreacted metal is removed by reaction with a compound inert to said steroid/metal complex prior to decomposition of said complex.

7. A process as claimed in claim 6 in which said compound with which said excess metal is reacted in bromobenzene.

8. A process as claimed in claim 1 in which said compound with which said excess metal is reacted is ethylene dibromide.

9. A process as claimed in claim 1 in which, after decomposition of the steroid/metal complex, the steroid material is esterified with a compound selected from the group consisting of acetic anhydride and benzoyl chloride.

10. A process as claimed in claim 1 in which, after decomposition of the steroid/metal complex, the steroid material is hydrolysed.

11. A process for the preparation of 3β-hydroxy-11-oxo-5α:22a-spirostane comprising reacting in an inert reaction medium 3β:12 diacetoxy-11-oxo-5α:22a-spirostane with a metal selected from the group consisting of alkali and alkaline earth metals in the presence of liquid ammonia; decomposing the resulting steroid/metal complex and hydrolysing the steroid material resulting from the decomposition.

12. A process for the preparation of 3β-acetoxy-11-oxo-5α:22a-spirostane comprising reacting in an inert reaction medium 3β:12 diacetoxy-11-oxo-5α:22a-spirostane with a metal selected from the group consisting of alkali and alkaline earth metals in the presence of liquid ammonia; decomposing the resulting steroid/metal complex and esterifying with acetic anhydride the steroid material resulting from the decomposition.

References Cited in the file of this patent

UNITED STATES PATENTS

| | | |
|---|---|---|
| 2,397,656 | Gallagher | Apr. 2, 1946 |
| 2,471,697 | Minlon | May 31, 1949 |
| 2,602,804 | Kendall | July 8, 1952 |
| 2,656,363 | Neumann | Oct. 20, 1953 |
| 2,702,290 | Sondheimer | Feb. 15, 1955 |